(12) United States Patent
Aoi et al.

(10) Patent No.: US 7,553,361 B2
(45) Date of Patent: Jun. 30, 2009

(54) WATER BASE INK FOR INK-JET RECORDING

(75) Inventors: Noriatsu Aoi, Ichinomiya (JP); Akihiko Taniguchi, Haguri-gun (JP); Ryuji Kato, Ama-gun (JP); Hideo Ohira, Tajimi (JP); Masaya Fujioka, Nagoya (JP); Shunichi Higashiyama, Yotsukaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 179 days.

(21) Appl. No.: 11/175,268

(22) Filed: Jul. 7, 2005

(65) Prior Publication Data
US 2006/0005743 A1  Jan. 12, 2006

(30) Foreign Application Priority Data
Jul. 9, 2004 (JP) .............................. 2004-203633

(51) Int. Cl.
*C09D 11/00* (2006.01)
(52) U.S. Cl. .................................. 106/31.6; 106/31.86
(58) Field of Classification Search ................ 106/31.6, 106/31.86
See application file for complete search history.

(56) References Cited

U.S. PATENT DOCUMENTS

| | | | | |
|---|---|---|---|---|
| 5,637,138 A | * | 6/1997 | Yamazaki | 106/31.32 |
| 5,637,140 A | * | 6/1997 | Fujioka | 106/31.35 |
| 6,513,922 B2 | * | 2/2003 | Katsuragi et al. | 347/100 |
| 6,596,068 B1 | * | 7/2003 | Ito et al. | 106/31.6 |
| 2001/0008908 A1 | * | 7/2001 | Parazak | 523/160 |
| 2002/0029722 A1 | * | 3/2002 | Shioya et al. | 106/31.43 |
| 2002/0059883 A1 | | 5/2002 | Takada et al. | |
| 2005/0275701 A1 | * | 12/2005 | Aoi et al. | 347/100 |

FOREIGN PATENT DOCUMENTS

| | | |
|---|---|---|
| EP | 0 802 247 A2 | 10/1997 |
| EP | 1 035 177 A1 | 9/2000 |
| EP | 1 120 446 A1 | 8/2001 |
| EP | 1 287 993 A1 | 3/2003 |
| EP | 1 479 732 A1 | 11/2004 |
| JP | A 9-3374 | 1/1997 |
| JP | A 2003-138179 | 5/2003 |
| JP | A 2003-147235 | 5/2003 |

* cited by examiner

*Primary Examiner*—Jerry Lorengo
*Assistant Examiner*—Veronica Faison Gee
(74) *Attorney, Agent, or Firm*—Oliff & Berridge, PLC

(57) ABSTRACT

A water base ink for ink-jet recording contains self-dispersible carbon black as a coloring agent. The total content of an organic acid having a number of carbon or carbons of 1 to 6 and a salt of the organic acid is not more than 400 ppm. The organic acid having a number of carbon or carbons of 1 to 6 includes monocarboxylic acid, dicarboxylic acid and oxy acid, and the salt of the organic acid includes salts of these acids. When the water base ink is used in an ink-jet recording apparatus, the discharge stability of the ink is improved.

6 Claims, No Drawings

WATER BASE INK FOR INK-JET RECORDING

BACKGROUND OF THE INVENTION

1. Field of the Invention

The present invention relates to a water base ink for ink-jet recording.

2. Description of the Related Art

The ink-jet recording method is a printing technique in which ink droplets are formed by the ink discharge method including, for example, the electrostatic attraction method, the method in which mechanical vibration or displacement is applied to the ink by using a piezoelectric element or the like, and the method in which bubbles are generated by heating the ink to utilize the pressure generated thereby. All or a part of the ink droplets are landed on a recording objective material such as paper to perform the recording.

In the ink-jet recording method, dye inks using a dye as a coloring agent have been hitherto widely used for the following reason. The dye ink hardly causes inconveniences such as deposition of precipitates because the dye is dissolved in the ink, and the ink is relatively excellent in handling performance.

In the recent years, however, pigment inks using a pigment such as carbon black have been used as the coloring agent for the following reason. The pigment is more effective than the dye at enhancing the density of the image area although the pigment has a lipophilic surface and thus is not excellent in dispersion stability in water. Accordingly, with the pigment, it is possible to enhance the contrast between the image area and the non-image area for the following reason. The dye is dissolved in the ink at the molecular level and thus behaves in the same manner as a solvent used in the ink and permeates into a recording objective material such as paper. On the other hand, pigment particles constituting the pigment are prohibited from moving (permeating) by, for example, the additives and fibers contained in the recording objective material. Therefore, the pigment particles tend to remain on the paper surface, thereby enhancing the concentration of image and line areas and the contrast of these areas. In addition, the pigment ink is more effective than the dye for the problem of "blurring". The blurring refers to such a phenomena that the ink nonuniformly spreads along the surface of recording objective material when the ink permeates thereinto. As a result, the edge of an image area and/or line area become jaggy. The pigment ink is more effective than the dye ink in avoiding the blurring because the pigment ink is dispersed in the ink as the solid content whereas the dye ink is dissolved in the ink at molecular level. Thus, with the pigment ink, the sharp edge of image area and/or line area can be obtained more easily than with the dye ink.

The pigment ink, however, is inferior to the dye ink in dispersion stability in water as described above. Accordingly, there are following problems associated with the pigment ink. When an ink-jet recording apparatus with the pigment ink is left to stand for a long period of time after performing an ink-jet recording, there are problems in some cases such that the pigment particles in the pigment ink are aggregated in the interval between ink-jet recording operations and/or even during the next ink-jet recording operation; the aggregated particles cause a clog-up of a nozzle of the recording head of the apparatus; the aggregated particles adhere or firmly fix to the surrounding of nozzle, thereby damaging a repellent ink coat, which in turn causes the discharge failure such as non-discharge and incorrect discharge in ink flying direction (bending). In view of these problems, there is a demand to prevent the discharge failure and to improve the discharge stability regarding the amount of ink droplet, the discharge speed or the like. For this purpose, various methods have been devised.

For example, there is a method in which the surface of carbon black is chemically treated so as to introduce a functional group such as carboxyl group and sulfonic group, thereby providing the water dispersiblity to the carbon black. The chemically treated carbon black has a self-dispersiblity in which the carbon black (pigment) exhibits the negative zeta potential. The ink using this self-dispersible carbon black, however, has the following problem. When the ink contains cations such as sodium ion, potassium ion, calcium ion and magnesium ion, the cations are bonded to the negative charge on the surface of carbon black particles, and the electric charge becomes zero. As a result, the electric repulsive force among the particles of carbon black is lost and the aggregation of the particles is easily caused.

In order to solve the problem, in the ink using the self-dispersible black ink, it has been devised to control the quantity of impurities of the cations in the ink so as to prevent the aggregation of carbon black.

U.S. Pat. No. 5,637,140 corresponding to Japanese Patent Application Laid-open No. 9-3374 discloses to control the total content of fatty acids, such as palmitic acid and stearic acid, contained as impurities in the ink to be not more than 0.3% by weight so as to prevent the clogging of nozzles, the incorrect discharge in ink flying direction, the change in ink drop quantity and the changes in flying speed of the ink which would be otherwise caused by the insoluble salts of the fatty acids. Japanese Patent Application Laid-open Nos. 2003-138179 and 2003-147235 disclose to control the total content of a fatty acid and a fatty acid salt to be not more than 0.5% by mass to lower the coefficient of redispersion of the ink and thus improve the dispersibility, thereby preventing the pigment particles from excessively moving on the surface of recording objective material and improving the abrasion resistance or the like. In Japanese Patent Application Laid-open Nos. 2003-138179 and 2003-147235, the fatty acid is defined as a saturated or unsaturated alkylcarboxylic acid having a number of carbons of 8 to 22 such as lauryl acid and paltimic acid, and that the fatty acid salt is defined as a salt formed of the above-defined fatty acid and an organic or inorganic cation. In addition, Japanese Patent Application Laid-open No. 2003-138179 discloses that a pigment particle has a polar group such as carboxyl group and sulfonic group on the surface thereof.

However, in the water ink for ink-jet recording containing the self-dispersible carbon black as the coloring agent, the discharge stability could not be sufficiently improved even by lowering the total content of cations, the higher fatty acid such as palmitic acid and stearic acid and the salt thereof, respectively contained in the ink as impurities. In addition, the ink jet printer of the recent model has an increased number of nozzles which are minuter than conventional nozzles in order to obtain more highly defined images. Under the circumstances, it is demanded more than ever to further improve the discharge stability from the nozzles.

SUMMARY OF THE INVENTION

The present invention has been made in order to satisfy the demand as described above, an object of which is to provide a water base ink for ink-jet recording which contains self-dispersible carbon black as the coloring agent, and which is capable of improving the discharge stability and preventing the discharge failure, the incorrect discharge in ink flying direction, the change in ink drop quantity and the change in flying direction of the ink, thereby realizing more highly defined printing than the conventional inks.

The inventors discovered, through the diligent experiments and research on the various kinds of causative substances which affect the discharge stability in a water base ink for ink-jet recording containing self-dispersible carbon black as coloring agent, that the discharge failure is caused by not only the cation and higher fatty acid, but also by a lower organic acid or a salt of lower organic acid contained in the ink, especially the ion of a low-molecular weight organic acid having a number of carbon or carbons of 1 to 6.

According to the present invention, there is provided a water base ink for ink-jet recording comprising:

self-dispersible carbon black as a coloring agent; and water, wherein a total content of an organic acid having a number of carbon or carbons of 1 to 6 and a salt of the organic acid in the ink is not more than 400 ppm.

The water base ink for the ink-jet recording of the present invention contains, as the coloring agent, the self-dispersible carbon black capable of enhancing the contrast of recorded image and preventing the blurring. In addition, the total content of the organic acid having a number of carbon or carbons of 1 to 6 and the salt of the organic acid in the ink is restricted below a specific amount. Accordingly, it is possible to prevent the aggregation of carbon black in the ink, thereby preventing the clog-up at the nozzles or orifices of the ink-jet printer, maintaining the satisfactory discharge stability, and realizing the highly defined printing.

The mechanism of action resulted by restricting the total content of the organic acid having a number of carbon or carbons of 1 to 6 and the salt of the organic acid contained in the ink to be not more than 400 ppm, especially not more than 50 ppm, is considered as follows, although the mechanism has not been fully revealed.

When the organic acid and the salt of the organic acid are in the form of a free ion in the ink, the organic acid and the salt thereof are charged with the same electric charge as that of self-dispersible carbon black. Therefore, it is seemed that the organic acid and the salt thereof do not affect the dispersion stability. However, after the water content in the ink has been evaporated at an ink discharge channel of ink-jet printer, the water hydrated to the organic acid or the salt thereof is substituted with an involatile solvent, so that the organic acid and the salt thereof hardly exist as the free ion. On the other hand, an electric double layer is formed in the surrounding of the particle of self-dispersible carbon black. The electric double layer means such a transition layer in which the ratio of positive electric charge is gradually increased so that the negative electric charge on the surface of the particle of self-dispersible carbon black is neutralized to be an overall electric charge possessed by the ink. In this case, the above-described organic acid or the salt thereof neutralizes the cations in the electric double layer to lower the surface potential of the particles of the self-dispersible carbon black, thereby causing the aggregation of the particles of self-dispersible carbon black by Van del Waals Force. It is considered that an organic acid molecule produced by the neutralization is adsorbed to an oxide such as hydroxyl group, quinone group or lactone group which has the similar structure to that of the organic acid molecule and bonded to the surface of the carbon black particles. This adsorption decreases the repulsive force in the electric double layer in the surrounding of the particles of the self-dispersible carbon black. As a result, the aggregation of the self-dispersible carbon black is also caused.

In order to solve the problem, it is possible to control the contents of the organic acid and the salt thereof to prevent the aggregation of such a self-dispersible carbon black.

DESCRIPTION OF THE PREFERRED EMBODIMENTS

Embodiments of the present invention will be explained below. The water base ink for ink-jet recording of the present invention contains self-dispersible carbon black as the coloring agent.

In self-dispersible carbon black, a functional group is introduced to the surface thereof so that the carbon black is negatively charged (i.e. exhibits negative zeta potential) in the ink, thereby improving the dispersibility of the carbon black.

The carbon black may include, for example, furnace black, lamp black, acetylene black, and channel black.

A method for introducing a functional group to the surface of carbon black may include, for example, introduction of a carboxyl group, a hydroxyl group, a sulfonic group or the like by oxidation treatment or chemical bonding treatment or the like. It is also possible to use a graft carbon in which the carbon black has been surface-treated with a high molecular dispersing agent or the like. A carbon black, in which a carboxyl group has been introduced to the surface thereof, is particularly desired in view of the discharge stability and the water resistance.

As the self-dispersible carbon black having a carboxyl group as the surface functional group, it is possible to use a commercially available product exemplified, for example, by CAB-O-JET 300, CAB-O-JET 200, CAB-O-JET 250, CAB-O-JET 260, CAB-O-JET 270 (respectively produced by Cabot), LIOJET WD BLACK 002C (produced by Toyo Ink, Ltd.), BONJET BLACK CW-1, BONJET BLACK CW-2, BONJET BLACK CW-3 (respectively manufactured by Orient, Ltd.).

It is desired that the content of self-dispersible carbon black in the ink is 3 to 6% by weight. In addition to the self-dispersible carbon black, the ink of the present invention may contain other pigment and/or dye as the coloring agent, if necessary.

As described above, the ink of the present invention is characterized not only by containing the self-dispersible carbon black as coloring agent, but also by making a total content of the organic acid having a number of carbon or carbons of 1 to 6 and the salt of the organic acid to be not more than 400 ppm. Accordingly, the aggregation of carbon black in the ink is prevented and the satisfactory discharge stability is maintained.

Specifically, the organic acid having a number of carbon or carbons of 1 to 6 and the salt of the organic salt, which total amount should be restricted, may be exemplified by mono-carboxylic acid such as formic acid, acetic acid, propionic acid, butyric acid and acrylic acid; dicarboxylic acid such as oxalic acid, malonic acid, succinic acid, glutaric acid, adipic acid, maleic acid, itaconic acid; oxy acid such as phosphoric acid, lactic acid and citric acid; and salts of these acids.

In some cases, these organic acids or the salt thereof are intentionally contained as a pH-adjusting agent or unintentionally contained as impurities in the ink. For example, when a surfactant prepared by using an organic acid or a salt thereof as a neutralizing agent for treatment of production residue is added to the ink as an optional component, the organic acid or the salt thereof can be mixed in the ink.

Accordingly, in order to make the total content of the organic acid and the salt thereof to be not more than 400 ppm in the ink, any organic acid or salt thereof should not be used as the pH-adjusting agent or neutralizing agent. In addition, a component or components used for the ink should be selected to have extremely small contents of the organic acid having a number of carbon or carbons of 1 to 6 and the salt of the organic acid, respectively. Alternatively, the component or components for the ink may be refined before being added to the ink, or may be refined during the preparation process of the ink. The refining method may include, for example, electrodialysis, microfiltration, ultrafiltration, and the use of reverse osmosis membrane. In order to make the total content of the organic acid having a number or carbon or carbons of 1 to 6 and the salt of the organic acid to be not more than 50 ppm, it is particularly desired to refine the ink components such as pigment and solvent in advance by the above-described refining method.

Although the total content of the organic acid having a number of carbon or carbons of 1 to 6 and the salt of the organic acid is preferably as small as possible, the use of high-purity material or the repeated refining treatments increase the cost for manufacturing the ink. From a practical point of view, it is desired to make the total content of the organic acid having a number of carbon or carbons of 1 to 6 and the salt of the organic acid to be 200 to 400 ppm. It is also conceivable to use a resin to disperse a carbon black, rather than using any self-dispersible carbon black as the coloring agent.

The ink of the present invention uses water as the solvent. As the water to be used, it is preferable to use waters having high purities such as ion exchange water, distilled water, pure water, and ultrapure water, rather than ordinary water.

The ink of the present invention may contain various kinds of components as long as the ink contains the self-dispersible carbon black as the coloring agent and the total content of the organic acid having a number of carbon or carbons of 1 to 6 and the salt of the organic acid in the ink is not more than 400 ppm. For example, a water-soluble organic solvent can be used as the ink solvent in addition to water.

The water-soluble organic solvent is blended in the ink to avoid the drying up of the ink and the deposition of solid matters from the ink due to the evaporation of water principally at the tip section of the ink-jet head. Accordingly, as the water-soluble organic solvent, it is desired to select a low volatile solvent which may include, for example, polyhydric alcohols such as ethylene glycol, diethylene glycol, triethylene glycol, polyethylene glycol, propylene glycol, dipropylene glycol, tripropylene glycol, polypropylene glycol, 1,3-butanediol, 1,5-pentanediol, 1,6-hexanediol, glycerol, 1,2,6-hexanetriol, 1,2,4-butanetriol, 1,2,3-butanetriol, and petriol; and nitrogen-containing heterocyclic compounds such as N-methyl-2-pyrrolidone, N-hydroxyethyl-2-pyrrolidone, 2-pyrrolidone, 1,3-dimethylimidazolidinone, and ε-caprolactam. These water-soluble organic solvents may be used singly, or in a mixture of any combination thereof.

The content of the water-soluble organic solvent in the ink is preferably 5 to 40% by weight, more preferably 7 to 40% by weight, and much more preferably 10 to 35% by weight with respect to the total amount of the ink. If the content is less than 5% by weight, then the moistening function is insufficient and a problem is likely to occur such that the ink is dried up and the solid matter is deposited after the evaporation of water in the ink. In contrast, when the content of the water-soluble organic solvent is made to be not less than 7% by weight, then the aggregation and the clog-up hardly occur even after the evaporation of water in the ink. On the other hand, if the content exceeds 40% by weight, then the problems occur such that the viscosity of the ink is unnecessarily increased to cause the discharge failure, and the ink is dried extremely slowly on the recording objective material.

The ink of the present invention may contain polyhydric alcohol alkyl ether, if necessary, as the permeating agent to control the permeability of the ink. Specifically, the polyhidric alcohol alkyl ether may be exemplified by propylene glycol propyl ether, diethylene glycol monomethyl ether, diethylene glycol monobutyl ether, diethylene glycol monoisobutyl ether, diethylene glycol dimethyl ether, diethylene glycol diethyl ether, diethylene glycol dibutyl ether, dipropylene glycol monomethyl ether, dipropylene glycol monopropyl ether, dipropylene glycol monoisopropyl ether, dipropylene glycol monobutyl ether, dipropylene glycol dimethyl ether, dipropylene glycol dipropyl ether, dipropylene glycol dibutyl ether, triethylene glycol monomethyl ether, triethylene glycol monobutyl ether, tripropylene glycol monomethyl ether, tripropylene glycol monobutyl ether, triethylene glycol dimethyl ether, triethylene glycol dibutyl ether, tripropylene glycol dimethyl ether, and tripropylene glycol dibutyl ether.

The content of the permeating agent in the ink is preferably 0.05 to 15% by weight with respect to the total amount of the ink.

The ink of the present invention may contain monohydric alcohol such as ethanol and isopropyl alcohol for the purpose of controlling the drying performance and the permeability of the ink into the recording objective material.

In addition, the ink of the present invention may contain an anionic surfactant, a nonionic surfactant or the like for the purpose of adjusting the surface tension of the ink and thus improving the discharge stability, the introducing performance into the head, the printing quality or the like. Specifically, the anionic surfactant may be exemplified by EMAL, LATEMUL, LEVENOL, NEOPELEX, ELECTROSTRIPPER, NS SOAP, KS SOAP, OS SOAP, PELEX, and AMPHITOL series produced by Kao Corporation; and LIPOLAN, K LIPOLAN, LIPON, SUNNOL, LIPOTAC TE, ENAGICOL, LIPAL, LIONOL, and LOTAT series produced by Lion Corporation. The nonionic surfactant may be exemplified by EMULGEN, RHEODOL, RHEODOL SUPER, EMASOL, EMASOL SUPER, EXCEL, EMANON, AMIET, and AMINON series produced by Kao Corporation; and DOBANOX, LEOCOL, LEOX, LAOL, LEOCON, LIONOL, CADENAX, LIONON, LEOFAT, ETHOFAT, ETHOMEEN, ETHODUOMEEN, ETHOMID, and AROMOX produced by Lion Corporation. The surfactants as described above may be used singly or in the form of any mixture thereof.

In addition, known dye-dissolving agents, antiseptic/fungicidal agents and rustproofing agents may be added to the ink of the present invention if necessary.

The ink of the present invention is usable as the ink for ink-jet recording based on various kinds of discharge method including, for example, the thermal method and the piezo method.

When the ink of the present invention is applied to the method in which ink is discharged in accordance with the action of thermal energy, additives for adjusting thermal physical values (such as the specific heat, the coefficient of thermal expansion, and the coefficient of thermal conductivity) may be added to the ink of the present invention.

EXAMPLES

The present invention will be specifically explained below on the basis of Examples. The numbers of Comparative Examples respectively correspond to the numbers of Examples for the purpose of comparison.

Examples 1 to 3 and Comparative Examples 1 to 3

Inks of Examples 1-3 and Comparative Examples 1-3 were obtained respectively as follows. To prepare each of the inks, components each indicated in Table 1 were sufficiently mixed and agitated, and then filtrated through a membrane filter having a pore size of 1 µm. The amounts of the components are indicated as weight percent in Table 1. As the self-dispersible carbon black, CAB-O-JET 300 (produced by Cabot, pigment dispersion liquid having a pigment content of 15% by weight) was used. Polyvinyl pyrrolidone K-12 contained 100 ppm of lactic acid used to adjust the pH during the synthesis of the polyvinyl pyrrolidone K-12. Amine alkylene oxide was a mixture in which C is 8 to 18 and a mole number of EO is 5, and which contained 200 ppm of acetate ions used during the synthesis of the amine alkylene oxide for the neutralization purpose. As the antiseptic/fungicidal agent, PROXEL GXL(S) produced by Avecia K.K. was used.

When the inks of Examples 2 and 3 were prepared, the following pretreatment was performed in order to lower the concentration of organic acid in the inks. CAB-O-JET 300 (pigment dispersion liquid) was subjected to the ultrafiltration at 7,000 rpm for 2 hours by using Macrosep Centrifugal Device (10K) produced by PALL Life Science to obtain only pigments. The pigments, from which the organic acid (and the ion and salt thereof) had been removed as described above, were diluted with pure water to prepare pigment dispersion liquid containing the same amounts of solid matters as those of the original pigment dispersion liquid. The solvents contained in the inks of Examples 2 and 3, respectively, were subjected to a pre-treatment as follows. For each of the inks, a mixture liquid was prepared by mixing components other than the pigment. The mixture liquid was agitated for not less than 20 minutes. After that, the mixture liquid was allowed to pass through an OH type strongly basic ion exchange resin to remove the organic acid (and the ion and salt thereof) from the mixture liquid. The pH of the mixture liquid was raised as a result of the use of the OH type strongly basic ion exchange resin. Therefore, the mixture liquid was neutralized with nitric acid to obtain the same state as that established before the treatment with the ion exchange resin. The pretreatments as described above were not performed for Example 1 and Comparative Examples. It is noted that in Example 1, polyvinyl pyrrolidone K-12 including lactic acid was used in a smaller amount than the amount used in other examples and comparative examples.

Evaluation (1) Measurement of Contents of the Organic Acid having a Number of Carbon or Carbons of 1 to 6 and the Salt of the Organic Acid With respect to the inks obtained in the examples and comparative examples, respectively, the contents of the organic acid having a number of carbon or carbons of 1 to 6 and the salt of the organic acid were measured as follows. Each of the inks was subjected to the ultrafiltration at 7,000 rpm for 2 hours by using Macrosep Centrifugal Device (10K) produced by PALL Life Sciences to remove the pigment. After that, the contents of the organic acid having a number of carbon or carbons of 1 to 6 and the salt of the organic acid in the respective inks were measured by the anion chromatography. It is confirmed that variety of kinds of the organic acids having a number of carbon or carbons of 1 to 6 and the salt of the organic acid were contained in the respective inks, which were mainly lactic acid, acetic acid, formic acid and oxalic acid. The total amounts of the organic acids and the salt thereof in the respective inks were indicated as ppm in Table 1.

(2) Evaluation of Discharge Stability

With respect to the inks obtained in the examples and comparative examples, respectively, the discharge stability was evaluated as follows. When an ink is left to stand for 72 hours in a thermostatic chamber in which the temperature was 60° C. and the humidity was 40% Rh to evaporate the water in the ink, it has been known that there are empirical correlations (a) to (c) as indicated below between the discharge stability and the state of the ink after the evaporation of water:

(a) After the evaporation of water, when no aggregation occurs in the ink and the fluidity of the ink is maintained, the discharge stability of the ink in a continuous discharge for 30 days is satisfactory.

(b) After the evaporation of water, when the ratio of aggregates in the ink as microscopically observed (magnification: ×400) is less than 10% or the fluidity of the ink has been lost, the discharge stability of the ink in a continuous discharge for 30 days is slightly deteriorated.

(c) After the evaporation of water, when the ratio of aggregates in the ink as microscopically observed (magnification: ×400) is not less than 10% or the ink is dried up, the discharge stability of the ink during a continuous discharge for 30 days is deteriorated and the discharge stability cannot be restored.

Each of the inks obtained in the examples and comparative examples was left to stand for 72 hours in a thermostatic chamber in which the temperature was 60° C. and the humidity was 40% Rh to evaporate the water in the ink. With respect to each of the inks, the discharge stability was determined based on the state of the ink in accordance with the above-described empirical relationships, and the following three criteria of "A", "B" and "C" for the discharge stability were established.

A: Discharge stability is satisfactory in case of (a)
B: Discharge stability is slightly deteriorated in case of (b)
C: Discharge stability is deteriorated in case of (c)

Each of the inks was evaluated based on these criteria for the state of the ink after the water had been evaporated as described above. The result of evaluations is indicated in Table 1.

TABLE 1

|  | Ex. 1 | Comp. Ex. 1 | Ex. 2 | Comp. Ex. 2 | Ex. 3 | Comp. Ex. 3 |
| --- | --- | --- | --- | --- | --- | --- |
| self-dispersible carbon black | 25 | 25 | 33.3 | 33.3 | 33.3 | 33.3 |
| glycerol | 30 | 30 | 25 | 25 | 20 | 20 |
| dipropylene glycol monopropyl ether | 5 | 5 | 1 | 1 | 1.5 | 1.5 |
| triethylene glycol monobutyl ether |  |  | 0.5 | 0.5 |  |  |

TABLE 1-continued

|  | Ex. 1 | Comp. Ex. 1 | Ex. 2 | Comp. Ex. 2 | Ex. 3 | Comp. Ex. 3 |
|---|---|---|---|---|---|---|
| 2-propanol |  |  |  |  | 2 | 2 |
| polyvinyl pyrrolidone K-12 | 1 | 1.5 | 5 | 5 | 3 | 3 |
| amine alkylene oxide |  |  |  |  | 2 | 2 |
| antiseptic/fungicidal agent |  |  |  |  | 0.1 | 0.1 |
| pure water | balance | balance | balance | balance | balance | balance |
| Ultrafiltration of the pigment | No | No | Yes | No | Yes | No |
| Ion-exchange treatment of the solvent | No | No | Yes | No | Yes | No |
| Contents of organic solvent having number of carbon(s) of 1 to 6 and salt thereof | 392 | 426 | 28 | 893 | 42 | 1263 |
| Discharge stability | A | B | A | B | A | C |

In Example 1, it is considered that the total content of organic acid having a number of carbon or carbons of 1 to 6 and the salt of the organic acid was not more than 400 ppm because the used amount of polyvinyl pyrrolidone K-12 including lactic acid was smaller than those in other examples or comparative examples. In Examples 2 and 3, the total content of organic acid having a number of carbon or carbons of 1 to 6 and the salt of the organic acid was not more than 50 ppm, respectively, because the pigment and solvent had been refined. In Comparative Examples 1 to 3, the total amount of organic acid having a number of carbon or carbons of 1 to 6 and the salt of the organic acid exceeded 400 ppm. As appreciated from Table 1, in each of Comparative Examples 1 to 3, the evaluation of discharge stability after the evaporation of water was "B" or "C". On the other hand, in all of Examples 1 to 3, the evaluation of discharge stability after the evaporation of water was "A" which is satisfactory. Accordingly, it is appreciated that with the inks of Examples 1 to 3, it is possible to prevent the printing failure due to the non-discharge caused by the aggregation of pigment, the bending of discharged ink caused by deposition of precipitates, the change in ink drop quantity, the change in flying speed of the ink or the like.

The ink of the present invention is effective as a pigment ink usable in ink-jet printers based on various kinds of the ink-discharge method.

What is claimed is:

1. A water base ink for ink-jet recording comprising:
    self-dispersible carbon black as a coloring agent; and
    water,
    wherein an organic acid having a number of carbon or carbons of 1 to 6 and a salt of the organic acid is included in the ink, and a total content of the organic acid having the number of carbon or carbons of 1 to 6 and the salt of the organic acid in the ink is not more than 50 ppm.

2. The water base ink for ink-jet recording according to claim 1, wherein the organic acid having a number of carbon or carbons of 1 to 6 is at least one selected from a group consisting of monocarboxylic acid, dicarboxylic acid and oxy acid.

3. The water base ink for ink-jet recording according to claim 1, wherein the self-dispersible carbon black has a carboxyl group as a surface functional group.

4. The water base ink for ink-jet recording according to claim 1, further comprising a water-soluble organic solvent.

5. The water base ink for ink-jet recording according to claim 4, wherein the water-soluble organic solvent is one which has been ion-exchange treated.

6. The water base ink for ink-jet recording according to claim 1, wherein the carbon black is one which has been previously refined by ultrafiltration.

* * * * *